US 6,542,967 B1

(12) United States Patent
Major

(10) Patent No.: US 6,542,967 B1
(45) Date of Patent: Apr. 1, 2003

(54) CACHE OBJECT STORE

(75) Inventor: Robert Drew Major, Orem, UT (US)

(73) Assignee: Novell, Inc., Provo, UT (US)

( * ) Notice: Subject to any disclaimer, the term of this patent is extended or adjusted under 35 U.S.C. 154(b) by 0 days.

(21) Appl. No.: 09/337,241

(22) Filed: Jun. 22, 1999

Related U.S. Application Data

(60) Provisional application No. 60/128,829, filed on Apr. 12, 1999.

(51) Int. Cl.[7] .............................................. G06F 12/02
(52) U.S. Cl. ........................ 711/134; 711/135; 711/113; 711/4
(58) Field of Search ................................ 711/160, 161, 711/133, 135, 136, 116, 113, 118, 112, 122, 4, 206, 128; 707/103, 104; 706/16; 710/30

(56) References Cited

U.S. PATENT DOCUMENTS

| | | | |
|---|---|---|---|
| 5,420,983 A | * 5/1995 | Noya et al. ................... 710/30 |
| 5,692,129 A | 11/1997 | Sonderegger et al. .. 395/200.11 |
| 5,717,884 A | * 2/1998 | Gzym et al. ................. 711/206 |
| 5,737,518 A | 4/1998 | Grover et al. ......... 395/183.14 |
| 5,761,499 A | 6/1998 | Sonderegger ............... 395/610 |
| 5,787,439 A | 7/1998 | Taysom ...................... 707/103 |
| 5,794,232 A | 8/1998 | Mahlum et al. ............... 707/3 |
| 5,832,274 A | 11/1998 | Cutler et al. ................ 395/712 |
| 5,832,487 A | 11/1998 | Olds et al. .................... 707/10 |
| 5,859,978 A | 1/1999 | Sonderegger et al. .. 395/200.56 |
| 5,878,415 A | 3/1999 | Olds ............................. 707/9 |
| 5,903,720 A | 5/1999 | Stokes ......................... 395/186 |
| 5,903,755 A | 5/1999 | Matheson et al. .......... 395/683 |
| 5,913,025 A | 6/1999 | Higley et al. ............... 713/201 |
| 5,915,253 A | 6/1999 | Christiansen ............... 707/103 |
| 5,991,810 A | 11/1999 | Shapiro et al. ............. 709/229 |
| 6,014,667 A | 1/2000 | Jenkins et al. ................ 707/10 |
| 6,029,175 A | * 2/2000 | Chow et al. ................. 707/104 |
| 6,047,358 A | * 4/2000 | Jacobs ........................ 711/128 |
| 6,081,900 A | 6/2000 | Subramaniam et al. ..... 713/201 |
| 6,112,228 A | 8/2000 | Earl et al. .................... 709/205 |
| 6,128,623 A | * 10/2000 | Mattis et al. ................ 707/103 |
| RE36,989 E | * 12/2000 | White ......................... 711/118 |
| 6,157,925 A | 12/2000 | Jenkins et al. ................ 707/10 |
| 6,163,773 A | * 12/2000 | Kishi .......................... 706/16 |
| 6,185,612 B1 | 2/2001 | Jensen et al. ............... 709/223 |
| 6,219,676 B1 | 4/2001 | Reiner ........................ 707/201 |

FOREIGN PATENT DOCUMENTS

WO     99/53422     * 10/1999

OTHER PUBLICATIONS

Kumar et al., "Exploiting Spatial Locality in Data Caches using Spatial Footprints", © 1998 The 25th Annual International Symposium on Computer Architecture, p. 1–12.*
U.S. patent application Ser. No. 09/195,982, pending, Date Unknown.
W3C Jigsaw, "Setting up Jigsaw as a Proxy", http://www.12.w3.org/Jigsaw/Doc/User/proxy.html, Jun., 1998, pp. 1–5.
Sun Microsystems, Inc., "Java Servlet API", http:/www.java.sun.com/products/servlet/index.htmly, Copyright 1995–1998, pp. 1 and 2.
Sun Microsystems, Inc., "Jave Server", http://www.javasoft.com/marketing/enterprise/javaserver/html, Copyright 1995–1998, pp. 1 and 2.

* cited by examiner

Primary Examiner—Do Hyun Yoo
Assistant Examiner—B. R. Peugh
(74) Attorney, Agent, or Firm—Schwegman, Lundberg, Woessner & Kluth, P.A.

(57) ABSTRACT

A cache object store is organized to provide fast and efficient storage of data as cache objects organized into cache object groups. The cache object store preferably embodies a multi-level hierarchical storage architecture comprising a primary memory-level cache store and, optionally, a secondary disk-level cache store, each of which is configured to optimize access to the cache object groups. These levels of the cache object store further exploit persistent and non-persistent storage characteristics of the inventive architecture.

22 Claims, 4 Drawing Sheets

CACHE OBJECT STORE

REFERENCE TO PROVISIONAL APPLICATION

This patent application claims the benefit under 35 U.S.C. §119(e) of U.S. Provisional Patent Application No. 60/128,829, now U.S. Pat. No. 6,112,228, titled, Cache Object Store, by Drew Major and filed on Apr. 12, 1999, which application is hereby incorporated by reference as though fully set forth herein.

CROSS-REFERENCE TO RELATED APPLICATIONS

This invention is related to the following copending and commonly assigned U.S. Patent Applications:

U.S. patent application Ser. No. 09/023,895, now U.S. Pat. No. 6,112,228, titled, Client Inherited Functionality Derived from a Proxy Topology where each Proxy is Independently Configured by Douglas G. Earl et al, filed on Feb. 13, 1998; and U.S. patent application Ser. No. 09/195,982, now U.S. Pat. No. 6,330,605, titled, Proxy Cache Cluster by Brent Ray Christensen et al, filed on Nov. 19, 1998.

BACKGROUND OF THE INVENTION

Users having computers interconnected by an institutional intranet or local area network may access various remote sites (such as those on the "World-Wide Web") via the well-known Internet communications network. Using resident web browser applications executing on the computers, these "clients" may navigate among data ("pages") stored on various servers ("web sites") and may further view the contents of these pages as desired. In a basic network communication arrangement, clients are free to access any remote web site for which uniform resource locator (URL) addresses are available. It is increasingly common in network applications to provide each client with access to a so-called proxy server that links to the Internet. A proxy server accesses requested data from the web sites and stores it locally (i.e., "caches" the data) to effectively speed-up client access and reduce the download time of future requests for the data. In response to a request from a browser executing on a client, the proxy server attempts to fulfill that request from its local cache storage; if it cannot, the proxy server forwards the request over the Internet to a server that can satisfy the request. The server then responds by transferring a stream of data to the proxy server, which caches and forwards the data onto the client.

Caches have become increasingly important in the context of proxy servers as the amount of data consumed over networks increases. A cache system typically stores a subset of an entire data set in its store and that data is constantly rotated in and out of the cache in accordance with an algorithm that identifies the data to be replaced, such as a conventional least recently used algorithm.

The cache system is not the primary source of the data set and, therefore, it can retrieve any data that has been deleted or lost from a source that "publishes" the data. Despite increasing network bandwidth, it is desirable to cache data closer to the consumer is of that data, especially as local client access speeds and content density increase. In this context, closeness is defined in terms of bandwidth or accessability to the data so as to enhance a user's experience. The typical Internet model wherein the publisher of the data is provided with substantial content capacity, i.e., the ability to service (or deliver) content as requested, is fundamentally non-scalable. Wide spread use of caching technology increases scalability and decreases content access requests at the content origin site.

Cache systems generally rely on the ability to organize access requests in a fast storage mechanism, such as memory composed of random access memory devices. If the cache of a proxy server is servicing a busy communications channel, it will eventually exhaust the memory. At this point, the system may (in accordance with the conventional replacement algorithm) either discard portions of the cached data or move those portions from memory to another storage mechanism, such as a disk. Although this latter option increases the persistency of the cached data and extends the amount of cache memory, it also introduces a relatively slow storage mechanism into the cache system.

Two common paradigms for the persistent storage of data are file systems and database systems. A file system contains general knowledge of the organization of the data stored on storage devices, such as memories and disks, needed to implement properties/performance of a desired storage architecture. A database system provides as structured data model that may be implemented on a file system or other storage architecture. Notably, there is an expectancy that the data (i.e., "content") stored on the file system or database will be preserved until explicitly removed. Persistency with respect to the storage of content, e.g., naming of data files and their non-volatile storage, is paramount to other properties/performance metrics such as organization of, and speed of access to, the to stored content. As such, these characteristics of a file system or database are not generally suited to the access and volatility characteristics of a cache system.

Conventional file systems have evolved to take advantage of the higher disk densities but have not generally overcome limitations of the number of disk operations per second. Disk density/capacity generally increases on a price/performance curve similar to that of semiconductor technologies by, e.g., making disk tracks thinner. However, disk access times are not decreasing at the same rate due primarily to physical constraints; indeed, the number of disk operations per second is increasing only minimally due to rotational latencies and head-throw seek times.

Therefore, a feature of the present invention is to provide a cache system that efficiently retrieves and stores data transferred over a computer network.

Another feature of the present invention is to provide a cache system having features of a persistent store and a non-persistent store.

Yet another feature of the invention is to provide a cache system that includes volatile and non-volatile (e.g., disk) storage capabilities.

Yet another feature of the invention is to provide multiple memory abstractions that allow exploitation of the characteristics of a cache environment.

Still yet another feature of the present invention is to provide a cache system that includes a mechanism for reducing the number of disk operations needed to store data and that advantageously utilizes disk density.

SUMMARY OF THE INVENTION

The invention comprises a cache object store organized to provide fast and efficient storage of data as cache objects, which can be organized into cache object groups. The cache object store preferably embodies a multi-level hierarchical storage architecture comprising (i) a primary memory-level (RAM) cache store and (ii) a secondary disk-level cache store, each of which is configured to optimize access to the cache object-groups. These levels of the cache object store further cooperate to provide an enhanced caching system that exploits persistent and non-persistent storage characteristics of the inventive architecture.

In the illustrative embodiment of the invention, the memory-level and disk-level stores are optimized as fast cache components by exploiting the characteristics/attributes of memory and disk storage devices constituting these stores. For example, the memory devices are configured to be efficiently accessed on "natural" boundaries to conform with address mapping arrangements, whereas the disks are optimized for such attributes as geometry, head movement and sector interleaving. If another tertiary-level cache is used in the hierarchical architecture, those storage devices would be similarly characterized and advantageously employed.

A cache object manager implements various aging and storage management algorithms to manage the cache object store. An example of such an aging policy is a modified least recently used (LRU) algorithm that strives to keep those object groups that are accessed most often in the primary-level cache store, with as many remaining object groups stored on the secondary-level store for quick retrieval. According to the cache object manager policy, each object group is marked with a time of last access that indicates the frequency at which object group is accessed within the cache store, and a cost of reacquisition to determine which object groups to move or delete.

A cache directory manager cooperates with the cache object manager to implement the storage management policies. The secondary-level store is primarily used to locate certain object groups from memory to disk if the aging mechanism recommends relocation. Relocation of an object will result in one of three states: object in RAM only, object in RAM and disk, or object on disk only. The cache directory manager maintains lists of object groups to be moved for each object group size. The storage management policy seeks to optimize movement of cache object groups from memory to disk by, e.g., moving the disk head as little as possible.

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF AN ILLUSTRATIVE EMBODIMENT

Figure 1:
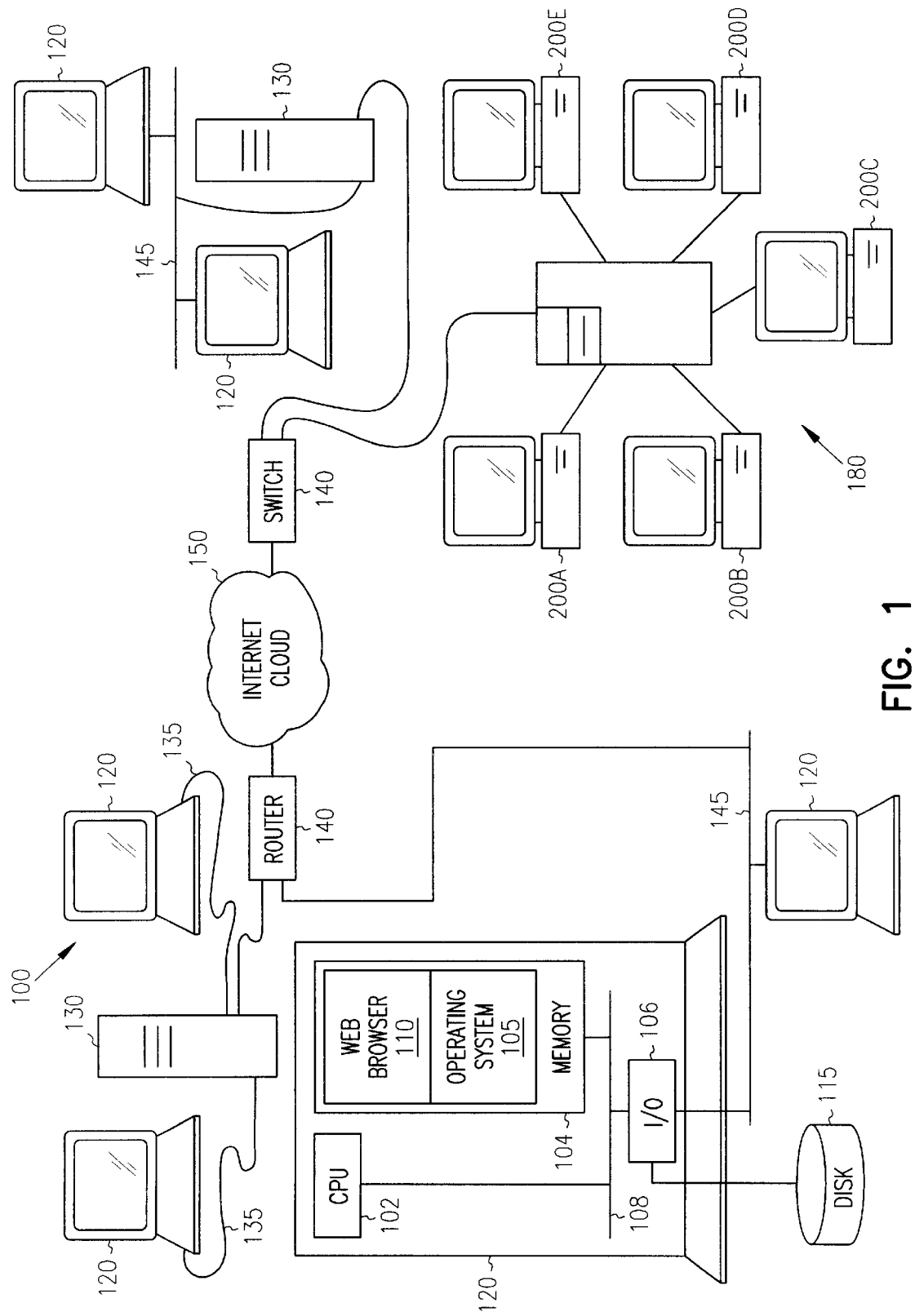
FIG. 1 is a block diagram of a network including a collection of network segments connected to a plurality of client and server computers, the latter of which may be organized as a service provider.

FIG. 1 is a schematic block diagram of a computer internetwork 100 comprising a collection of network segments connected to a plurality of computers 120, 130, 140 and 200. Each computer generally comprises a central processing.unit (CPU) 102, a memory unit 104 and an input/output (I/O) unit 106 interconnected by a system bus 108. The memory unit 104 may comprise storage locations typically composed of random access memory (RAM) devices, which are addressable by the CPU 102 and I/O unit 106. An operating system 105, portions of which are typically resident in memory and executed by CPU, functionally organizes the computer by, inter alia, invoking network operations in support of application programs executing on the CPU. An example of such an application program is a web browser 110, such as Netscape Navigator™ available from Netscape Communications, Inc.

The I/O unit 106 connects the computer to the network segments and to at least one mass storage device 115. As described herein the mass storage device, such as a disk, may function as a component of an enhanced cache system for storing information relating to, e.g., content available on the network. Typically, the I/O unit 106 provides information, such as control and data signals, to the CPU 102 for storage/retrieval of data from the disk or for transfer over the network segments.

The network segments may comprise local area networks or intranets 145, point-to-point links 135 and an Internet cloud 150. Collectively, the segments are interconnected by intermediate stations 140, such as a network switch or router, and configured to form an internetwork of computers that communicate by exchanging data packets according to a predefined set of protocols, such as the Transmission Control Protocol/Internet Protocol (TCP/IP). It should be noted that other techniques/protocols, such as Internet Packet Exchange (IPX) protocol, File Transfer Protocol (FTP), and the Hypertext Transfer Protocol (HTTP), may be advantageously used with the present invention.

In the illustrative embodiment, the internetwork 100 is organized in accordance with a client/server architecture wherein computers 120 are personal computers or workstations configured as clients for interaction with users and computers 130, 200a–e are configured as servers that perform services as directed by the clients. For example, the servers 200 may be configured to operate as a service provider (e.g., an Internet service provider 180 such as concentric.net) as described further herein, whereas servers 130 may be configured as domain name system (DNS) servers and/or Internet provider servers. In general, the DNS servers provide the clients 120 with the network (e.g., IP) addresses of requested services in response to packets directed to the domain names of those services. The Internet providers, on the other hand, provide Internet access to the clients via, e.g., dial-up telephone lines or cable links.

Figure 2:
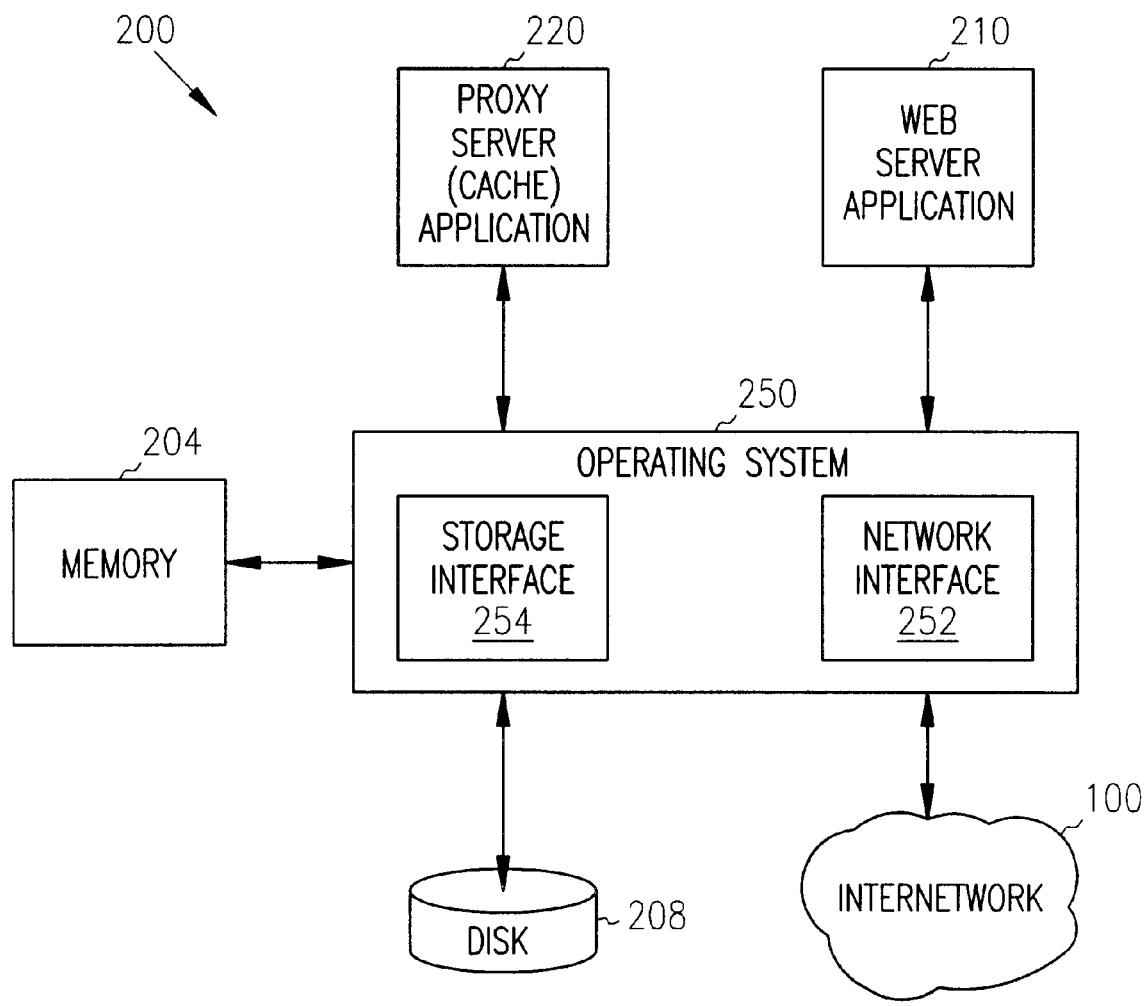
FIG. 2 is a highly schematized diagram of software components of the service provider server of FIG. 1.

The client 120 may further utilize the web browser 110 to gain access to the web site 180 and to navigate, view or retrieve services stored on the web servers 200. The pages are typically hypertext documents created using a conventional hypertext markup language (HTML) format. In order to effectively speed-up access to the service provider and reduce the retrieval time for stored services, each web server 200 may be provided with access to a proxy cache server. FIG. 2 is a highly schematized diagram of software components of the web (service provider) server 200. These components generally include an operating system 250 having utility programs that interact with various application program components to provide functionality, including a network interface for communication with a client browser 110 over the network 100. The application program components include a web server application 210 and a proxy server application ("proxy") 220.

Since the proxy 220 "front-ends" the web server, the network address of the proxy (rather than the actual web site) is published in the DNS server 130 and that address is mapped to the domain name of the service provider. To access a service of [the service provider] web site 180, the client sends a request packet directed to the network address of a particular proxy 220 of the web site. The proxy 220 receives the request from the browser 110 and, if the client is authorized to access services from the web site, the proxy attempts to fulfill that request locally from information stored, e.g., in memory 204 or on disk 208; in either case, the memory and/or disk cooperate to provide an enhanced cache system for quickly storing and retrieving the services. If it cannot satisfy the request, the proxy forwards the request onto the web server application 210. The web server application then responds by transferring a stream of information to the proxy, which stores (caches) and forwards the information onto the browser 110. Although the proxy 220 is shown as resident on the web server 200, it should be noted that the proxy may also be configured to run on a separate server platform.

Cache Object Store

Figure 3:
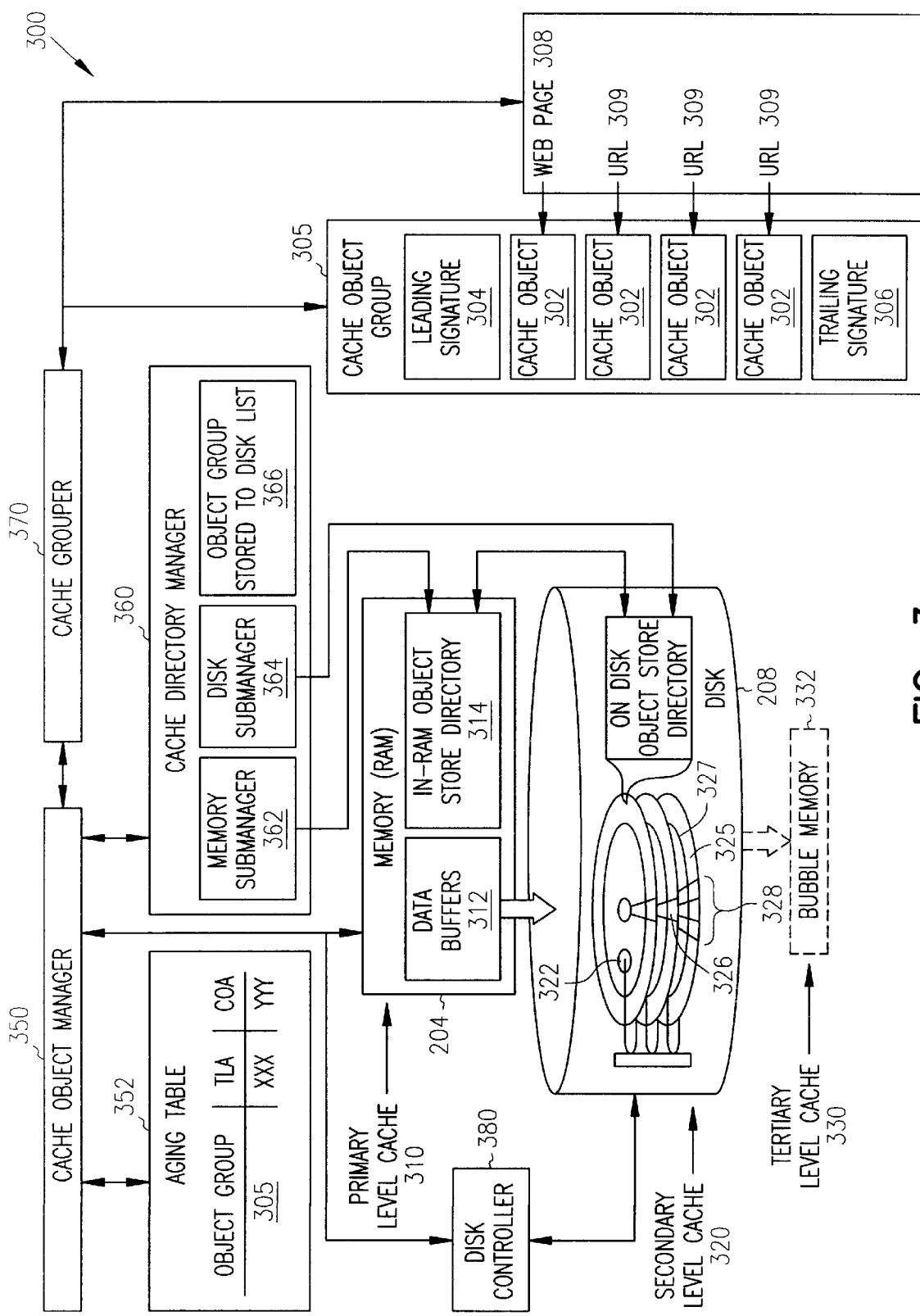
FIG. 3 is a schematic block diagram of a multi-level hierarchical architecture of an inventive cache object store comprising a primary-level cache store and a secondary level cache store, each of which is configured to optimize access to cache object groups in accordance with a cache object manager according to the invention.

FIG. 3 is a schematic block diagram of the enhanced cache system which is preferably organized as a novel cache object store 300 to provide fast and efficient storage of data as cache objects 302. A cache object is characterized as a collection of data that is persistent over a predetermined period of time, but that can be recovered if lost. For example, if a user request is made to the proxy 220 to retrieve the contents of a home web page 308 (such as an HTML page) from a web site 180, the HTML page and the contents of all references comprise a cache object group. Likewise if the request is directed to retrieving a file using, e.g., the file transfer protocol (FTP), the cache object is the file to be retrieved. Characterization of a cache object thus generally applies to the form of a cacheable data structure that is responsive to, and therefore defined by, a particular request.

In the case of an HTML page, the content of that page generally references additional uniform resource locators (URLs) 309 and their content. The user that has requested access to the HTML page will likely reference the URLs present on that page; all of the content that is likely to referenced next may be defined as a cache object group 305. Organizing such information as a group is advantageous because a request to a particular page of a web site would likely be followed by accesses to the URL links present on the page. During a write operation affecting any portion of the cache object group, the entire object group is written. Later during a read operation, the entire group is retrieved to memory. Note that other definitions of a cache object group 305 may be used to address content characteristics.

The cache object store 300 is generally associated with a proxy cache within the internetwork; in the illustrative embodiment, however, the cache object store is associated with a Processor Memory Mechanism (PMM) of a proxy cache cluster (PCC). An example of a PCC system including a PMM that may be advantageously used with the present invention is described in copending and commonly-assigned U.S. patent application Ser. No. 09/195,982, titled Proxy Cache Cluster, by Brent Ray Christensen et al., which application is incorporated by reference as though fully set forth herein.

In accordance with the present invention, the novel cache object store 300 preferably embodies a multi-level hierarchical storage architecture comprising (i) a primary-level cache store 310 and (ii) a secondary-level cache store 320, each of which is configured to optimize access to the cache objects. The hierarchical architecture of the cache object store may be extended to accommodate another tertiary-level store 330 that may be slower than the secondary-level cache. For example, the hierarchical storage architecture may comprise volatile memory (RAM) 204 (or equivalent media) as the primary-level cache, non-volatile disk(s) 208 (or equivalent media) as the secondary-level cache and bubble memory 332 (or slower disk) as a tertiary-level cache. However, it should be noted that the inventive storage architecture may operate solely with a primary-level cache.

The various levels of the cache object store cooperate to provide an enhanced caching system that exploits persistent and non-persistent storage characteristics of the inventive architecture. For example, assume a cache object group 305 that is stored entirely in the primary memory store 310 is overwritten and is subsequently requested. Broadly stated, the cache object store 300 first checks the secondary cache store 320 for the object group and, if it is stored on disk, the object store retrieves the group. However, if the group was not stored on disk, the object store retrieves the content from its source in accordance with the non-persistent nature of a conventional cache.

In the former case described above, the persistence of the secondary cache store enables rapid reloading of the primary cache to a useful serving state according to the algorithms described herein. If a substantial period of time has passed before restoring the previous content state of the primary cache, most of that content is invalidated because of, e.g., specified Time-To-Live (TTL) values, whereas if only seconds or minutes has passed, most of that cache contents would be considered valid and available for serving because the TTL has not expired. In the latter case, the cache object store may be on a different platform than the source server; in that case, the novel object store "goes back" to the actual source server to fill the request and obtain the information again. Alternatively if the information is cached somewhere closer to the cache object store, the request may be directed to that closer cache.

In the illustrative embodiment, the memory-level and disk-level stores are optimized as fast cache components by exploiting the characteristics/attributes of RAM and disk storage devices. For example as described further herein, the RAM devices are efficiently accessed through hardware registers on "natural" segmented boundaries, whereas the disks are optimized for, e.g., geometry, head movement, cylinder versus track and sector interleaving. If another storage device is utilized as a tertiary-level cache, it would be similarly characterized and advantageously exploited.

A cache object manager process 350 controls the cache object store by implementing various aging and memory management algorithms, along with recording the number of data buffers that are allocable. For example, the cache object manager implements aging policies, such as a modified least recently used (LRU) algorithm described further herein. The cache object manager 350 also controls aging with respect to time of access and cost of re-acquisition of the data to thereby manage the full hierarchy (each level) of the cache store by, in part, determining when to remove select cache object groups. The cache object manager is preferably implemented as a state machine process that is executed, e.g., on the PMM platform; however, it will be apparent to those skilled in the art that the cache object manager may be implemented in hardware and may even reside on a different platform, e.g., in a shared memory model arrangement, as long as it has access to all of the cache memory.

When fetching new cache object (URL) groups from their origin, the proxy 220 examines the HTML pages 308 and determines which other URLs 309 are referenced (this is applicable to any content that has determinable pointers). The cache object manager uses this information to pre-load the cache object store 300 prior to the client requesting those URLs. There is generally only one copy of a URL in the cache object store except when a URL is sent to a consumer and another consumer asks for a refresh and/or the time-to-live (TTL) expires and there is a new copy that needs to be filled from the origin.

Cache object groups 305 are generally defined as references in some markup language or mechanism (e.g., HTML) and can be in one of two states: (1) the original page (e.g., HTML) is cacheable; and (2) the original page (e.g., HTML) that was used to define the object group is itself non-cacheable. This implies that when this page is referenced again it may return a different set of URLs. For example, consider a page with ads that are changed each time the page is viewed; many of the URLs on this page are the same but the added URLs may be different each time. A particular URL may be defined as being in more than one object group, e.g., a logo that appears on several web pages. A cache grouping function 370 logically associates these URL/page objects onto an object group 305 so that the entire group is moved to the cache object store 300. The cache grouper 370 is preferably invoked via Define ObjectGroup call issued by the cache object manager 350. According to the modified LRU aging policy, a predetermined percentage (e.g., 25%) of the last accessed cache object groups 305 are targeted for movement to a lower level in the memory hierarchy or for deletion at any time. The policy strives to keep those objects that are accessed most often in primary-level memory 310, but if they are written to [disk] secondary-level cache store 320, they still can be quickly retrieved. If they are deleted then reacquisition is necessary. If there is free space on the disk and the disk is idle, all object groups in RAM are written to disk. Each object group 305 is marked with a time of last access (TLA). A data structure, such as an aging table 352, is maintained by the object manager 350 that tracks the frequency at which object groups are accessed (TLA factor) within the cache system. The technique also factors in a cost of reacquisition (COA) in determining which object groups to move or delete. For example, cache object groups that originate from close sources and have a "low cost" of reacquisition are marked available for movement or deletion, while those objects that are expensive to reacquire are kept longer.

A strict LRU policy is not used because, if possible, it is desirable to avoid head-seek operations that require head movement as described further herein and targeting the last accessed objects makes it likely that there is free space close to current location of one of the disk's read/write heads. In other words, enforcement of strict LRU order when purging old cache objects may result in excessive head movement throughout the disk. Rather the modified LRU policy is employed that targets some selection of those objects for deletion based on relative computation of the last access times and reacquisition costs. For instance, if an object group is frequently accessed and its cost of reacquisition is high, that group will generally not be deleted. Instead, an object/group may be deleted that has a lower acquisition cost, despite being accessed frequently.

The cost of reacquisition may be empirically determined by measuring the turn-around time needed to acquire an object/group (of course, other mechanisms may be characterized which determine some cost of reacquisition). The turnaround time is defined as the time elapsed from when a request is issued to acquire an object to when the object is actually retrieved. For example, it may take 8 milliseconds to turnaround a request for 4,000 packets. This may be considered a relatively expensive reacquisition because the acquisition time is long and the size of the object/group is large. The modified LRU algorithm preferably factors in the cost of reacquisition in the following manner. Each object is tagged with a value between, e.g., 0 and 7, thereby providing eight (8) levels of reacquisition cost, wherein 0 is the most expensive and 7 the least expensive. The reacquisition cost is then used to factor the times when objects in each of the categories become available. The times are all relative to each other and may be presented on, e.g., a logarithmic or half scale basis.

For example, if the access time for a reacquisition cost level of 0 is 27 minutes, then the access time for level 1 is 18 minutes, the access time for level 2 is 12 minutes, the access time for level 3 is 8 minutes, the access time for level 4 is 5 minutes, the access time for level 5 is 3 minutes, the access time for level 6 is 2 minutes and the access time for level 7 is 1 minute. Alternatively, if the access time for level 0 is 512 minutes, then the access time for level 1 is 256 minutes, the time for level 2 is 128 minutes, the time for level 3 is 64 minutes, the time for level 4 is 32 minutes, the time for level 5 is 16 minutes, the time for level 6 is 8 minutes and the time for level 7 is 4 minutes. Note that the number of reacquisition levels can be easily changed, as well as the relative time differential between levels. Also note that even though a particular object is capable of being deleted, it may not actually be deleted. Movement or deletion of objects depends on, inter alia, the location of the disk head and the amount of data to be written.

Primary Level Cache

In the illustrative embodiment, the cache object store 300 utilizes all available memory 204 for storing ("caching") frequently accessed cache object groups 305 at the primary level store 310 with as many remaining object groups being cached on the secondary (or lower) level store(s) as possible. Note that a cache object group is preferably stored entirely in memory 204 or entirely not in memory, although this characteristic is not fundamental to the present invention.

The memory-level store is optimized by accessing the RAM devices through e.g., hardware index and displacement registers on a "natural" (4 K or 64 K) boundary, primarily because addressing is commonly mapped to such segmentation. The primary storage mechanism in RAM is a data buffer 312 preferably configured to accommodate a predetermined cache object size. The data buffers are used to "buffer" both data and metadata so that all disk operations occur through these buffers to reduce copies and transformations. Note that there are certain control structures that are not written to disk and thus do not use the data buffers.

In general, the cache object store renders disk write accesses as background operations and reserves all foreground disk capacity to read operations. That is, the cache object store does not write data to disk until it makes sense to write (e.g, the disk is idle and data matches available space at the current head location). Further, the cache object store 300 does not require conventional directory searches because it often finds the requested data promptly via in-RAM data structures with only one disk operation to retrieve or write the data and metadata.

An example of such an in-RAM data structure is an In-RAM cache object store directory 314. Each cache object group preferably has a representation within a directory in memory 204 that is used for mapping cache object groups to disk 208. Rather than marking a cache object group as deleted, the In-RAM directory is modified to indicate that the block of memory occupied by the group is available. The cache object store directory 314 is periodically written to disk (as governed by a predetermined policy); if the system goes "down", the directory is read from disk (on remount) and used to rebuild the In-RAM directory. When rebuilding the directory 314, bad (overwritten) object groups are detected and invalidated; in this case, the characteristics of the cache object store are used to re-fill the store from the source(s). As object groups are accessed during normal operations bad (overwritten) object groups are detected and invalidated if necessary.

The In-RAM cache object store directory 314 is characterized by a predetermined searching technique to rapidly located the object group in the cache store 300. It will be apparent to those skilled in the art that there are many ways to implement such an in-RAM directory, such as a tree-based or binary search organizations; however, the preferred embodiment uses hash-based URL searching to reduce the domain with which to manage information. The in-RAM cache object store directory 314 is generally coherent and up-to-date unless a failure occurs; in the event of a failure, it is rebuilt from the On-Disk object store directory when remounted.

A cache directory manager process 360 comprising a memory directory sub-manager 362 and a disk directory submanager 364 are adapted to manage the organizations of their cache object stores to implement efficient storage management policies. By moving the objects to disk, the invention characterizes the objects as "safer" to remove/delete from primary memory with newer, more active objects. The cache directory manager 360 maintains lists 366 of object groups for movement to disk for each object group size. When the objects 302 are completely defined, the object groups 305 are added to these lists. These lists 366 are preferably maintained in a first-in, first-out manner so that changes to the object group definition are likely to be realized before "flushing to disk" a first time. Note that secondary store is not required for correct operation of the invention, i.e., cache can operate entirely out of RAM.

Figure 4:
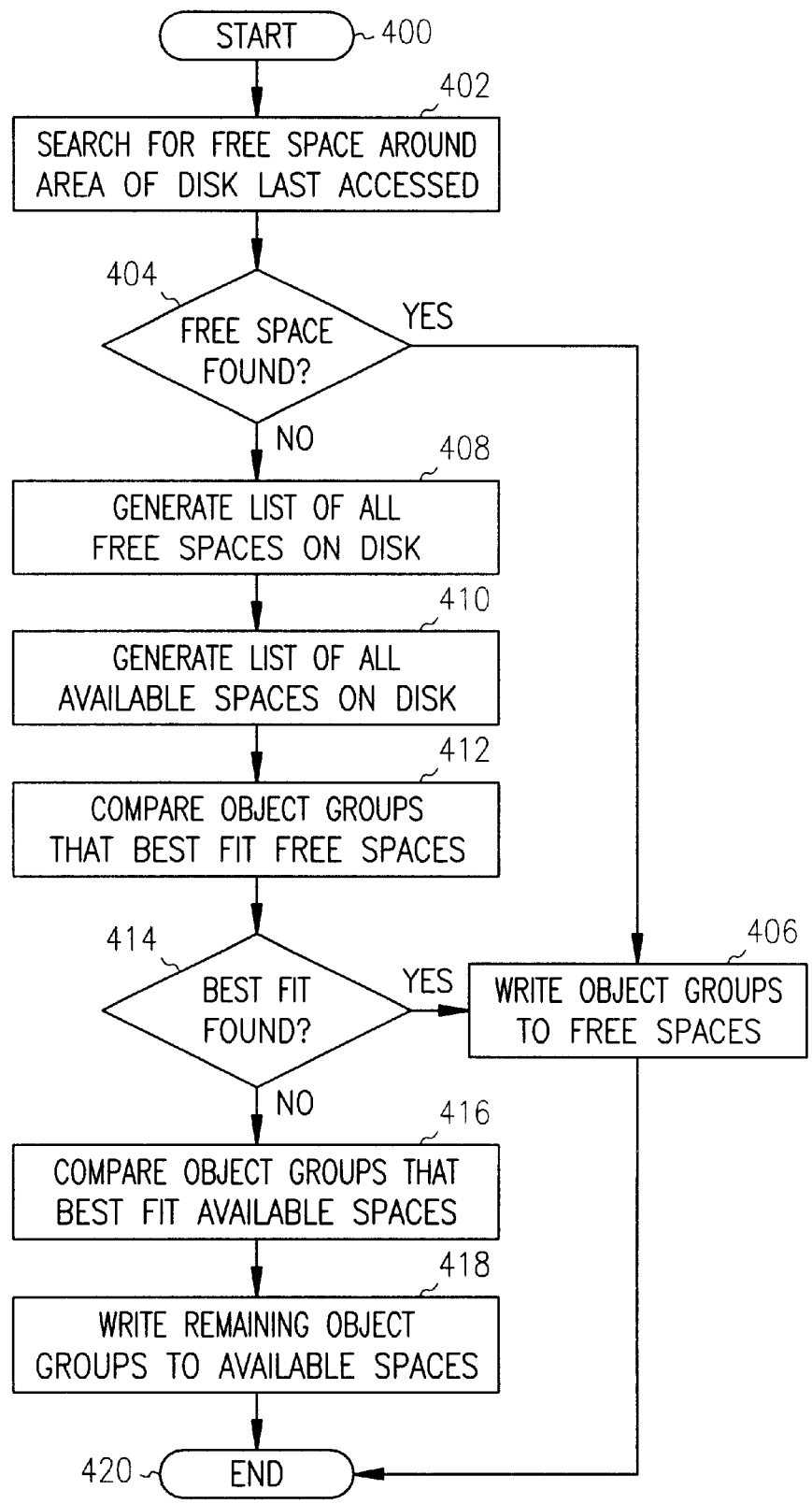
FIG. 4 is a flowchart illustrating a sequence of steps followed by a cache directory manager when executing a storage management policy with respect to moving a cache object group from the primary-level cache store to the secondary-level cache store in accordance with the present invention.

FIG. 4 is a flowchart illustrating the sequence of steps followed by the cache directory manager when executing a storage management policy with respect to moving a catche object group 305 from primary to secondary cache store 320. In general, the cache object store 300 and, in particular, the disk directory submanager 364 seek to optimize movement of cache object groups from memory to disk by, e.g., avoiding fragmentation of those object groups on disk. The sequence starts in Step 400 and proceeds to Step 402 is where a search is conducted for free space (i.e., over a preconfigured level) around the area of disk last accessed. If free space is discovered (Step 404), the cache object group is written to that free disk space in Step 406. If there is no free space found (Step 404), then a list of all free spaces on the disk is generated in Step 408. In Step 410, a list of used, but available spaces on disk is also generated.

In Step 412, combinations of object groups (l–n) are compared that would best fit one of the listed free spaces. Preferably, the comparison operation favors larger, completely free spaces, i.e., it is desirable to write the object group to only free space. If combinations of object groups are found that fit the free spaces (Step 414), then the cache object groups are written to that free disk space in Step 406. If not, combinations of object groups (l–n) are compared that would best fit one of the listed available spaces in Step 416. This step involves calculating available space by coalescing (fusing) boundaries between the two lists; again, this comparison operation favors larger free spaces. The remaining cache object groups are then written to the available spaces in Step 418 and the sequence ends at Step 420. As many object groups as possible will be written per write operation. Large object groups are given preference over small object groups.

Referring again to FIG. 3, the cache object store 300 may be characterized as a modified log structured file system that minimizes the number of disk operations by (i) mixing "metadata", i.e., data pertaining to the file system structure, with the actual data and (ii) orientating itself towards large contiguous write operations. The cache object store is a modified log structured file system because it can lose data stored thereon as a result of, e.g., server or disk failures, whereas a file system guarantees the integrity of stored data despite such failures. That is, the cache object store exploits the fact that it is just a cache and can always retrieve the data later.

Secondary Level Cache

In the illustrative embodiment, the cache object store may use a plurality of disks 208 as the secondary cache store 320. The cache object manager 350 optimizes the use of secondary storage by characterizing each disk in terms of geometry and its natural formatting using, e.g., cylinder, track and sector interleaving. If sector addressing is not desired, another kind of addressing scheme, such as clustering or "blocking", may be overlaid on sector addressing. Disk space is preferably allocated through disk sectors 326 and a plurality of disk sectors comprises a disk block 328. For example, a plurality of sectors may be organized as one addressable disk block of, e.g., 1 KB, 4 KB, 16 KB or 256 KB.

Disk blocks 328 can be used in a plurality of ways including (i) as the on-disk object group directory 324 used to rebuild the in-RAM object group directory 314 ; (ii) for storing actual data/metadata; (iii) as unused blocks; and (iv) as bad blocks including those blocks with I/O errors that are no longer used. The maximum size of a cache object group 305 is preferably 256 KB, although other object group sizes may be employed. Those objects or object groups that are greater than 256 KB are preferably apportioned into multiple 256 KB blocks.

In accordance with an aspect of the present invention, the cache object store 300 preferably writes ("stores") data in the vicinity of a last read or write operation. For example when storing cache object groups 305 on disk 208, the cache object store may skip certain disk sectors 326 to avoid erasing data contained thereon; in contrast, a log structured file system typically performs a "garbage collection" cycle that moves the data before overwriting the sectors. A log structured file system typically performs a seek operation followed by a write operation, whereas the cache object store often avoids such seeking. Unlike a log structured file system, the cache object store may not update a "master" record (e.g., directory) as part of a write operation.

A goal of the invention is to minimize read/write transducer 322 (head) movement when caching data on the disk

208 because such movement causes substantial delay when accessing the secondary storage level 320. Furthermore, a cache object group 305 is preferably accessed during each read/write operation to optimize disk accesses. Disk accesses preferably occur at locations close to the last access to minimize head movement for write operations while realizing performance increases with read operations. Although this may result in overwriting of cache object groups, the invention exploits the fact that the cache object store is not the original repository of the cached information and that it can retrieve the overwritten data again, if necessary.

As noted, all objects within a cache object group are preferably accessed together. A trailing signature 306 at the end of each object group 305 may be used to validate consistency; if the trailing signature is different than a leading signature 304 of the group, this may indicate that the object or object group was not completely written to disk. The disks 208 retrieve multi-sector data blocks 328 in disk order (i.e., data blocks are not initially retrieved from the middle of the sectors to thereby obviate faulty leading and trailing signature checking).

The cache object store treats each disk 208 independently and each object group 305 is always stored entirely on only one disk. Each cache object store on disk is accessed as a separate partition. Partitioning of the disk enables marking/reserving a portion of each disk as the cache object store, labeling that reserved portion as proprietary and non-accessible by other processes executing on the platform.

As also noted, a complete directory of the cache objects/groups stored in the primary level cache 310 and the secondary level cache 320 is maintained on the In-RAM cache object store directory 314 in memory 204. This allows monitoring of storage access activity among various areas of, e.g., the disk in order to implement storage management policies, such as ensuring utilization of all areas of the disk by prioritizing certain activities and areas for caching data. For example, the cache object store 300 prioritizes disk read accesses by attempting to perform disk write operations only on idle disks. In a system with multiple disks 208, the cache object store performs parallel disk accesses.

The cache object store 300 characterizes each cache object group to determine which group is "flushed" from memory 204 to disk 208 when the cache object store exhausts its memory while servicing a busy channel. Use of the secondary level store 320 increases the persistency of the cache object store because, rather than deleting an "aged" object group, the aging algorithm moves that group to disk. Since the object group 305 is still cached on the cache object store platform, if that group is subsequently needed, access to the group can be achieved quickly instead of having to go back to the source.

If write operations are occurring near the read operations, it is likely that there will be areas of the disk that are not being accessed. These areas may contain aged cache data objects that should be replaced. Accordingly, the cache object store writes to the "oldest" cache object groups and does a seek operation on back-to-back write accesses. New data is written to these "cold" areas. Since there are multiple possible targets (one per head) the object store determines the "best closest" area to write using the following ranking factors, in priority order: (i) write access immediately after another write access on the same head to substantially reduce latency; (ii) write access to disk free space rather than overwriting "old" cache object groups to maintain as much old data on the cache object store 300 as possible; (iii) write access to large free or freeable spaces; (iv) write access to a space where no or minimal space is wasted at the end; and (v) write access to a disk location that has minimal added latency.

Also, the cache object store attempts to minimize head 322 movement by confining data caching in the secondary storage level 320 to a certain area, thereby creating "high object access traffic". Consequently, other areas of the disk are not accessed often and become cold. As an area of the secondary store becomes colder, it's priority rises to a point where the management algorithm absorbs the delay required to move the heads to that cold area of the disk. Disk caching accesses then become concentrated in that area by minimizing head movement, thereby warming-up that area. This feature enables utilization of the entire geography of the disk.

According to the invention, the modified LRU algorithm may be advantageously used to implement a storage management policy that forces disk write operations to occur at these cold areas. Essentially, the algorithm cooperates with the directory 314 to provide a disk management policy that attempts to relocate the heads to the oldest cold area.

In order to maximize disk throughput, the secondary level cache 320 strives to keep multiple operations queued at a time. This may cause a slight inefficiency in read operations (since the next "best" read operation choice regarding parallel disk accesses is not always made). This also slows down the responsiveness to read accesses if two write operations are previously queued for execution. Ideally, a disk controller 380 signals the cache object manager 350 that the current disk operation is almost completed; that way a second operation may be subsequently queued and a better decision may be made with respect to that operation. Nevertheless, the cache object store may occasionally "waste" space due to set up/transfer times between previous operations; fundamentally, the intent is to keep the cache object store 300 constantly busy by maximizing the throughput and efficiency of the secondary level store 320.

While there has been shown and described an illustrative embodiment of a cache object store organized to provide fast and efficient storage of data as cache objects organized into cache object groups, it is to be understood that various other adaptations and modifications may be made within the spirit and scope of the invention. For example, it should be noted that each cache object/group is assigned a state as it transitions through various stages so that it can be managed by the cache object manager or, more particularly, the state machine implementation of the cache object manager. For instance, an object enters a state when it is first formed, it transitions to a new state when it exhausts its TTL, and another state is entered depending upon whether the object is in memory or moved to disk.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A cache object store organized to provide fast and efficient storage of data as cache objects organized into cache object groups, the cache object store comprising:

a primary-level store and a secondary-level store;

a cache grouper for logically associating cache objects into cache object groups; and a cache object manager cooperatively coupled to the cache grouper and configured to implement an aging policy, the aging policy maintaining a first cache object groups on the primary-level store and a second cache object groups on the secondary-level store;

a cache directory manager cooperatively coupled to the cache object manager to implement a storage management policy that moves certain first cache object groups from the primary-level store for storage on the secondary-level store as second cache object groups, and the aging policy is a modified least recently used (LRU) algorithm that marks each cache object group with (i) a time of last access (TLA) factor within the cache object store, and (ii) a cost of reacquisition (COA) factor used to determine which cache object group to delete or move.

2. The cache object store of claim 1 further comprising a tertiary-level store cooperatively coupled to the primary and secondary level stores.

3. The cache object store of claim 2 wherein the tertiary-level store comprises bubble memory.

4. The cache object store of claim 1 further comprising an aging table structure maintained by the cache object manager to track the TLA and COA factors during implementation of the modified LRU by the cache object manager.

5. A cache object store, comprising:

a primary-level store having random access memory;

a secondary-level store coupled to the primary-level store, the secondary-level store having at least one non-volatile disk;

a cache grouper for logically associating cache objects into cache object groups;

a cache object manager cooperatively coupled to the cache grouper and configured to implement an aging policy that maintains a first cache object groups on the primary-level store, the aging policy further maintaining a second cache object groups on the secondary-level store; and, a cache directory manager cooperatively coupled to the cache object manager to implement a storage management policy that moves certain of the first cache object groups from the primary-level store for storage on the secondary-level store as the second cache object groups, the storage management policy substantially improving storage of the second cache object groups on the secondary-level store by avoiding fragmentation of the second cache object groups on the secondary-level store, and wherein the storage management policy moves the first cache object groups from the primary-level store to the secondary-level store by first searching the secondary-level store at a location in proximity to where the secondary-level store was last accessed.

6. The cache object store of claim 5 further comprising a list of cache object groups maintained by the cache object manager that specifies those first cache object groups, by cache object group size, to move from the primary-level store to the secondary-level store.

7. The cache object store of claim 6 wherein the cache directory manager comprises a memory directory submanager and a disk directory submanager adapted to manage organizations of the primary-level and secondary-level stores, respectively, to thereby implement the storage management policy.

8. A method for efficiently storing data as cache objects on a cache object store, the method comprising the steps of:

providing a primary-level volatile store coupled to a secondary-level non-volatile store;

organizing the cache objects into cache object groups;

implementing an aging policy that maintains first, frequently-accessed cache object groups on the primary-level store and second, less-frequently-accessed cache object groups on the secondary-level store; and implementing a storage management policy that efficiently moves certain first cache object groups from the primary-level store for storage on the secondary-level store as second cache object groups, and the aging policy is a modified least recently used (LRU) algorithm for marking each cache object group with (i) a time of last access (TLA) factor indicating a frequency at which the cache object group is accessed within the cache object store, and (ii) a cost of reacquisition (COA) factor used to determine which cache object group to delete or move.

9. The method of claim 8 wherein the step of implementing the modified LRU aging policy further comprises the step of empirically determining the COA factor by measuring the turnaround time needed to acquire a cache object group, wherein the turnaround time is defined as time elapsed from when a request is issued to acquire the cache object group to when the cache object group is retrieved.

10. The method of claim 8 wherein the step of implementing the modified LRU aging policy further comprises the step of targeting those objects for movement or deletion based on relative computation of the TLA and COA factors.

11. A node for carrying out the method according to claim 8.

12. A computer network comprising at least one node for carrying out the method according to claim 8.

13. A computer-readable medium comprising: instructions for execution on a processor and data written thereon, said instructions and data containing information for the practice of the method of claim 8.

14. Electromagnetic signals traveling over a computer network comprising: said electromagnetic signals carrying information including instructions for execution on a processor for the practice of the method of claim 8.

15. A method for storing data as cache objects on a cache object store, the method comprising the steps of:

providing a primary-level volatile store coupled to a secondary-level non-volatile store;

organizing the cache objects into cache object groups;

implementing an aging policy that maintains first, frequently-accessed cache object groups on the primary-level store and second, less-frequently-accessed cache object groups on the secondary-level store; and, implementing a storage management policy that moves certain first cache object groups from the primary-level store for storage on the secondary-level store as second cache object groups, the management policy by avoiding fragmentation to each certain cache object group on the secondary-level, non-volatile store, and wherein and wherein the management policy moves the first cache object groups from the primary-level store to the secondary-level store by first searching the secondary-level store at a location in proximity to where the secondary-level store was last accessed.

16. The method of claim 15 wherein the secondary-level, non-volatile store comprises a disk and wherein the step of implementing the storage management policy further comprises the steps of:

conducting a search for a preconfigured level of free space around an area of the disk that is last accessed; and upon discovering the preconfigured level of free space, storing the certain cache object group on the free space.

17. The method of claim 16 wherein the step of implementing the storage management policy further comprises the steps of:

if the preconfigured level of free space is not discovered, generating a list of all free spaces on the disk; and generating a list of available spaces on the disk.

18. The method of claim 17 wherein the step of implementing the storage management policy further comprises the steps of:

comparing combinations of certain cache object groups that fit the listed free spaces; and if combinations of certain cache object groups are found that fit the free spaces, storing those certain cache object groups on the free disk spaces.

19. The method of claim 18 wherein the step of implementing the storage management policy further comprises the steps of:

if combinations of certain cache object groups are not found that fit the free spaces, comparing combinations of certain cache object groups that fit the listed available spaces; and storing the remaining certain cache object groups on the available disk spaces.

20. The method of claim 19 wherein the step of comparing combinations of certain cache object groups that fit the listed available spaces comprises the step of calculating the available spaces by coalescing boundaries between the two lists of spaces.

21. A cache object store, comprising:

a primary-level store;

a secondary-level store coupled to the primary-level store;

a cache grouper for logically associating cache objects into cache object groups;

a cache object manager cooperatively coupled to the cache grouper and configured to implement an aging policy that maintains a first cache object groups on the primary-level store, the aging policy further maintaining a second cache object groups on the secondary-level store; and, a cache directory manager cooperatively coupled to the cache object manager to implement a storage management policy that moves certain of the first cache object groups from the primary-level store for storage on the secondary-level store as the second cache object groups, the storage management policy substantially improving storage of the second cache object groups on the secondary-level store by avoiding fragmentation of the second cache object groups on the secondary-level store, and wherein the storage management policy moves the first cache object groups from the primary-level store to the secondary-level store by first searching the secondary-level store at a location in proximity to where the secondary-level store was last accessed.

22. A method for storing data as cache objects on a cache object store, the method comprising the steps of:

providing a primary-level store coupled to a secondary-level;

organizing the cache objects into cache object groups;

implementing an aging policy that maintains first, frequently-accessed cache object groups on the primary-level store and second, less-frequently-accessed cache object groups on the secondary-level store; and, implementing a storage management policy that moves certain first cache object groups from the primary-level store for storage on the secondary-level store as second cache object groups, the management policy by avoiding fragmentation to each certain cache object group on the secondary-level, non-volatile store, and wherein the storage management policy moves the first cache object groups from the primary-level store to the secondary-level store by first searching the secondary-level store at a location in proximity to where the secondary-level store was last accessed.

\* \* \* \* \*